United States Patent [19]

Lectard et al.

[11] Patent Number: 4,534,957

[45] Date of Patent: Aug. 13, 1985

[54] PROCESS FOR CONVERTING HYDRAGILLITE INTO BOEHMITE

[76] Inventors: Alain Lectard, 22 avenue Saint Jerome, Residence Les Pins, 13100 Aix-en-Provence; Robert Magrone, Quartier Mistral, Villa I, 13120 Gardanne, both of France

[21] Appl. No.: 492,564

[22] Filed: May 9, 1983

Related U.S. Application Data

[63] Continuation of Ser. No. 219,302, filed as PCT FR80/00030 Feb. 6, 1980, published as WO80/01799, Sep. 4, 1980 § 102(e) date Sep. 9, 1980, abandoned.

[30] Foreign Application Priority Data

Feb. 28, 1979 [FR] France ................................ 79 05688

[51] Int. Cl.[3] .................................................. C01F 7/02

[52] U.S. Cl. ..................................... 423/625; 423/631

[58] Field of Search ................................. 423/625, 631

[56] References Cited

U.S. PATENT DOCUMENTS

| | | | |
|---|---|---|---|
| 1,953,201 | 4/1934 | Toslund | 423/625 |
| 2,656,250 | 10/1953 | Thibon et al. | 423/625 |
| 2,659,660 | 11/1953 | Sable | 423/123 |
| 3,954,957 | 5/1976 | Koenig | 423/626 |
| 4,117,105 | 9/1978 | Heitzenberg et al. | 423/625 |
| 4,224,302 | 9/1980 | Ukamoto et al. | 423/625 |

FOREIGN PATENT DOCUMENTS

| | | | |
|---|---|---|---|
| 0035797 | 3/1977 | Japan | 423/625 |

*Primary Examiner*—H. T. Carter

*Attorney, Agent, or Firm*—McDougall, Hersh & Scott

[57] ABSTRACT

Hydragillite is converted into boehmite by preparing a suspension (A) of hydrargillite in water with a proportion from 150 g/l to 700 g/l of dry material expressed as $Al_2O_3$, subjecting it to heat treatment under pressure (D) at a temperature of from 200° C. to 270° C., the speed of the rise in temperature of said suspension being at least 1° C./minute, and causing it to pass a period of time of from 1 minute to 60 minutes in a holding zone (D) at a temperature in the range of from 200° C. to 270° C.

The boehmite produced has a granulometry which is at most identical to that of the initial hydrargillite, and has a much lower content of alkaline material.

10 Claims, 1 Drawing Figure

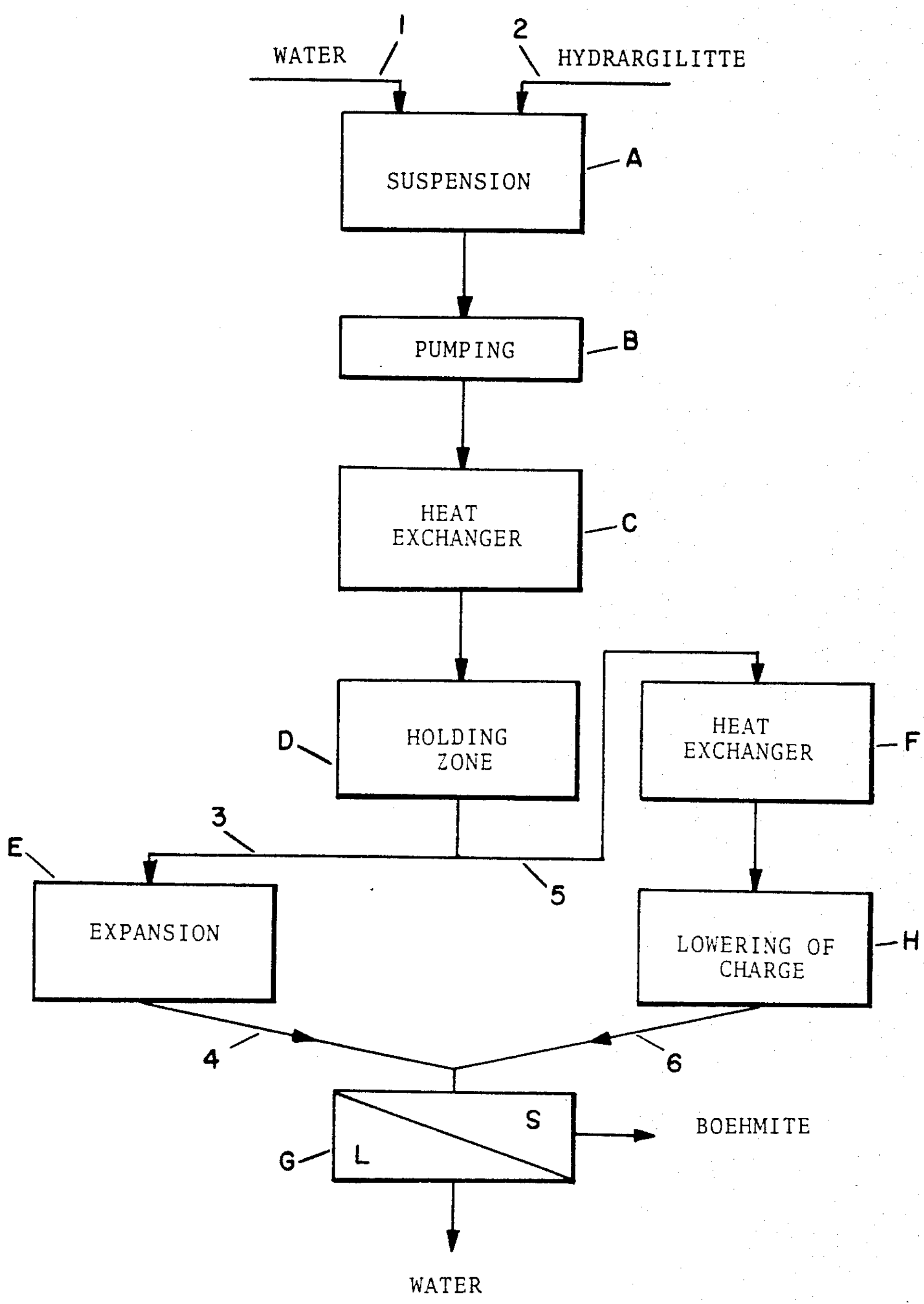
WATER
1
2
HYDRARGILITTE
SUSPENSION
A
PUMPING
B
HEAT EXCHANGER
C
HOLDING ZONE
D
HEAT EXCHANGER
F
3
E
5
EXPANSION
LOWERING OF CHARGE
H
4
6
S
L
G
BOEHMITE
WATER

PROCESS FOR CONVERTING HYDRAGILLITE INTO BOEHMITE

This is a continuation of application Ser. No. 219,302, filed as PCT FR 80/00030 Feb. 6, 1980, published as WO 80/01799, Sep. 4, 1980, § 102 date Sept. 9, 1980, and now abandoned.

The present invention concerns the continuous conversion of hydrargillite into boehmite in an aqueous medium at high temperature and under pressure. The special literature in this art has long provided disclosures of many processes for converting hydrargillite into boehmite in an acid or alkaline aqueous medium or even in water vapor.

Among the known processes, an early process for converting hydrargillite into boehmite in an acid medium was described in an article by R. Bumans. It comprised introducing an aqueous 1.75 M acetic acid solution into an autoclave with industrial hydrargillite, the resulting suspension being raised to a temperature of 200° C. for a period of 5 hours.

In another process for converting hydrargillite into boehmite in an alkaline medium, disclosed in Zeitschrift Anorg. alloy Chemic. Vol. 271, 1952, by Von Ginsberg, pages 41 to 48, a suspension of hydrargillite in an alkaline aqueous solution of variable concentration was subjected to a heat treatment in an autoclave at a temperature of from 150° C. to 200° C. In this article, the writer demonstrated that the speed of conversion of hydrargillite to boehmite increased both with the temperature and with the concentration of the alkali.

Another process carried out in a solely aqueous medium, is disclosed in "Jo Appl. Chem. Oct. 10, 1960, by Taichi Saito, Hydrothermal Reaction of Alumina Trihydrate." It comprises introducing 5 g of hydrargillite, dried at a temperature of 110° C., into an autoclave containing 500 cc of water, and heating the resulting medium either at a constant temperature of 200° C. or at increasing temperatures ranging from 140° C. to 200° C. for 2 hours. However, this article also disclosed that various tests showed that the conversion of hydrargillite to boehmite was already complete at a temperature of 200° C.

In spite of the interest in these publications, the processes described suffer from major disadvantages which are not compatible with an industrial conversion process, which requires a high reaction yield while consuming the minimum amount of energy.

Firstly, it appears that the conversion of hydrargillite into boehmite in a solely aqueous medium is effected starting from a suspension containing a small amount of dry material, which requires a heat treatment at a temperature of 200° C. extending over at least 2 hours.

Secondly, it is well known that the conversion of hydrargillite to boehmite in an acid aqueous medium is slowed down by the acidity of the medium.

Finally, the kinetics of conversion of hydrargillite into boehmite in an alkaline aqueous medium increase in speed in proportion to an increasing concentration of alkali in the reaction medium. It suffers from the major disadvantage of leaving substantial amounts of $Na_2O$ in the resulting boehmite, which makes it unsuitable for certain use.

Besides the above-indicated disadvantages, the three processes described in the literature also suffer from the common disadvantage of being discontinuous processes. Consequently, they are difficult to apply in an alumina production factory.

However, contemporary literature has also disclosed continuous processes for producing ultra-fine boehmite in an acid aqueous medium. Thus, for example, U.S. Pat. No. 3,954,957 describes a process involving finely crushing the hydrargillite, which is of Bayer origin, to from 1 to 3 μ, then subjecting it to heat treatment in an acid aqueous medium so as to produce very finely divided boehmite in which the grain size is at most 0.7 μ. Besides the disadvantage that it can only result in the production of a boehmite that is suitable for very limited uses, such as pigmentation in paint, ink and paper, etc., this process suffers from the additional disadvantage that it is carried out in an acid medium which consequent decrease in the speed of conversion.

The process according to the present invention comprises putting industrial hydrargillite (preferably moist) into water, forming a suspension containing an amount of dry material expressed as $Al_2O_3$ of from 150 g/l to 700 g/l, heating the suspension at a temperature in the range of from 200° C. to 270° C. at a speed of temperature rise of 1° C./minute, and holding the suspension for a period of from 1 minute to 60 minutes at a temperature in the said range. This process can be carried out continuously on an industrial scale and makes it possible to produce large quantities of an alumina that is suitable for many uses, particularly an alumina whose grain size is suitable for use in igneous electrolysis. The use of a suspension with a high content of dry material substantially increases the production of boehmite for an industrial installation of a given size. It is particularly advantageous to use suspensions whose concentration is from 400 g/l to 600 g/l of $Al_2O_3$ in the process of the present invention.

The treatment temperature has been found to be necessarily at least equal to 200° C. in order to limit the holding time for the suspension in the heat-treatment zone, but it is most desirable for the treatment temperature to be in the range of from 220° C. to 240° C.

The speed of temperature rise for the suspension of hydrargillite in water is advantageously as fast as possible, within limits compatible with the heat exchange involved and the type of reactor used. When the reactor used has a relatively low heat-exchange capacity, such as for example that which occurs in an indirect-heating autoclave series, the speed of temperature rise for the suspension is desirably in the range of from 1° to 5° C./minute. When the reactor used has a substantial heat-exchange capacity, for example a reactor of the monotube or polytube type, the speed of temperature rise could advantageously be at least 5° C./minute, while remaining compatible with the heat exchange involved.

The suspension is retained for a considerable time, dependent upon the concentration of dry material in the suspension and the treatment temperature selected. It is preferably from 3 to 10 minutes, in order to achieve the highest conversion yield.

In practice, the rise in temperature in accordance with the invention is preferably produced in an exchanger of monotube or polytube type. In this case, the speed of circulation of the suspension to be treated or in the course of treatment is at least 1.5 meters/second, in order to limit decantation of the dry material.

The present invention will be better understood with reference to the following description of the drawing illustrating the invention.

Referring to the drawing, a suspension of hydrargillite in water is prepared at A by introducing suitable amounts of water through 1 and dry hydrargillite through 2. After the dry material concentration has been adjusted, the resulting suspension is pumped under pressure at B into heat exchanger C, where it is raised to the selected temperature.

The treatment temperature may be produced by indirect heating by injecting vapor, for example in a double jacket, or by recovering the potential calorific energy from the already treated suspension by circulating it in counter-flow as a heat-exchange fluid, or by a combination of these two methods.

Upon being discharged from C, the suspension, raised to the desired temperature, is introduced into a holding reactor D where it passes the time required for complete conversion of hydrargillite to boehmite. The temperature produced in reactor D is generally at most equal to the temperature of the suspension at discharge from the exchanger C, by reason of the endothermicity of the hydrargillite-boehmite conversion reaction. It is for this reason that it is advantageous to provide for heating of this holding reactor.

After the holding time in reactor D has elapsed, the temperature and pressure of the suspension must be reduced in order to permit separation of the liquid and solid phases.

For this purpose, in accordance with a first alternative, the solution is passed through 3 into expansion zone E, which may be formed for example by a series of expansion means or valves.

The vapor produced in the expansion step may advantageously be recovered and recycled in heat exchanger C. A cooled suspension is thus produced which has a higher concentration of dry material, and which is passed through 4 into separation zone G in which the boehmite is recovered, for example by filtration under vacuum.

In a second alternative, the suspension is carried through 5 to a suitable heat exchanger F by means of a cooling fluid which may be the suspension issuing from the pump B. The pressure of the cooled suspension is then reduced in a pressure-drop means H, such as for example a series of tubes of decreasing diameter, in order to reduce it practically to atmospheric pressure. In this alternative form, it is desirable for the reductions in temperature and pressure of the suspension coming from D to be effected simultaneously by combining the two functions performed by stages F and H in a single piece of apparatus. Upon discharge from H, the cooled boehmite suspension returns to the separation zone G through 6, as already indicated above.

In both of the above-mentioned alternative forms, boiling the suspension in exchanger C or reactor D, or else simultaneously in C and D by virtue of insufficient expansion in E or insufficient pressure drop in H, a boehmite of much finer grain size than that of the original hydrargillite is obtained. This refinement is shown in particular by the increase in the proportion of grains of boehmite that pass through the meshes of a standard 15-micron sieve compared with the initial grains of hydrargillite.

On the other hand, if the pressures in C and D are sufficiently high with regard to the temperatures to avoid boiling the solution, it is found that (a) when expansion is effected in E, in accordance with the first alternative form, substantial refining of the boehmite with respect to the original means size of the hydrargillite is always produced, irrespective of the concentrations of dry material and the temperatures involved; (b) when performing the second alternative form, with given temperatures in C and D, it is possible to limit the degree of refining of the boehmite in the course of conversion or even to maintain the initial grain size of the hydrargillite upon conversion into boehmite.

In addition, the process according to the invention results in the production of a boehmite having a very low content of alkaline impurities, particularly of $Na_2O$, in comparison with the content of the same elements in the original hydrargillite.

The following examples illustrate the invention.

EXAMPLE 1 (As shown in the drawing)

In accordance with the invention, a suspension of hydrargillite in water was continuously prepared by introducing into the vessel. A, which is provided with effective agitation, 960 kg/hour of moist hydrargillite containing 12% by weight of residual water, originating from the Bayer process, and 730 liters/hour of industrial water.

The amount of dry material in the suspension, expressed as $Al_2O_3$, was close to 461 g/l.

By means of a diaphragm-type pump B, the suspension of hydrargillite was passed under pressure into a tubular reactor C formed by a tube that was 15 mm in inside diameter and 80 meters in length. The reactor was heated by introducing vapor into a double jacket situated outside the reactor and having an inside diameter of 50 millimeters. The flow rate of the suspension in the reactor was 1.2 $m^3$/hour, while the speed of circulation of the suspension was 1.88 m/s. Upon issuing from the tubular reactor, the temperature of the suspension was maintained at 210° C. by a control system.

The suspension was then introduced into the holding autoclave D, which was provided with a nest of heating tubes, where it stayed for a period of 15 minutes at a temperature of 210° C.

On issuing from the autoclave D, the suspension was subjected in E to an expansion stage, which reduced its pressure from about 23 bars to atmospheric pressure by passing it through two series-connected diaphragm-type expansion means or valves. The suspension was collected at G, where it was subjected to separation into liquid phase L and solid phase S.

In order to evaluate the conversion of hydrargillite into boehmite and to determine the evolution in respect of the various characteristics of the resulting product, a sample was taken from the solid phase and the loss from ignition was determined and found to be 16.9%, which showed that the conversion of hydrargillite to boehmite was complete.

The loss of 16.9% from ignition which is higher than a loss of 15% from ignition, which was theoretically expected, corresponded to the presence of 1.9% of free water occluded in the spaces within the boehmite crystals.

Many writers have demonstrated the presence of this water and have shown in particular that the loss from ignition at a temperature of 1100° C. of the boehmite could reach 17.4% by weight of the initial mass (B. Imelik: J. Chim. Phys. 1966, Vol. 4, pages 607 to 610).

In order to confirm this result, X-ray analysis was carried out, showing that the characteristic diffraction lines of hydrargillite for a cobalt anticathode (Bragg angle 21°35′–23°6′:the most intense lines) had totally disappeared and gave way to the characteristic lines of boehmite (cobalt anticathode: Bragg angle: 16°8′–32°-8′–44°8′:the most intense lines).

In addition, as expansion had been effected in E when the suspension issued from holding reactor D, it was found that the grains of boehmite produced were finer than the initial grains of hydrargillite, as can be seen from the following table which compares the grain sizes of the product before and after the hydrothermal conversion operation is effected.

| % by weight of grains smaller than | 100μ | 80μ | 60μ | 45μ | 30μ | 15μ |
|---|---|---|---|---|---|---|
| Starting Hydrargillite | 59.4 | 40.6 | 26.2 | 12.9 | 4.6 | 0.6 |
| Boehmite Produced | 85.9 | 75.6 | 70.8 | 63.4 | 55.7 | 40.0 |

It was thus found that the boehmite produced had been subjected to intense attrition.

Finally, it was found that the amount of sodium hydroxide, expressed in the form of $Na_2O$, in the boehmite produced, was 680 ppm, whereas the amount of sodium hydroxide in the initial hydrargillite subjected to the hydro-thermal conversion treatment was 4500 ppm, expressed as $Na_2O$.

Thus, the process according to the invention was found not only to be efficient in converting hydrargillite into boehmite but also particularly attractive by virtue of the surprising consideration of the substantial reduction in the final proportion of $Na_2O$.

EXAMPLE 2

A suspension of hydrargillite in water was continuously prepared in accordance with the invention by introducing into the vessel A, which was agitated, 960 kg/h of a hydrargillite from the Bayer process, which contained 12% by weight of residual water, and 730 liters/hours of industrial water. The amount of dry material in this suspension, expressed as $Al_2O_3$, was 461 g/liter.

The hydrargillite suspension was passed under pressure by means of diaphragm-type pump B into tubular reactor C, which was formed by a tube with an inside diameter of 15 millimeters and a length of 92 meters. The tubular reactor was heated as in Example 1 by means of a double jacket supplied with water vapor. The flow rate of the suspension in the installation was 1.2 m$^3$/hour. Upon discharge from the heat exchanger C, the suspension was introduced into an unheated cylindrical holding balloon-flask D of 100 liters volume. The temperature of the suspension in the flask fluctuated between 220° C. and 277° C.

The suspension then issued from the upper part of the flask and passed into a cooling zone F formed by a pipe system with an inside diameter of 15 mm and a length of 55 meters, which was immersed in circulating water. The temperature at discharge from this zone was about 75° C.

After this cooling zone, the suspension circulated into a pressure drop zone H formed by a first tube with an inside diameter of 15 mm and a length of 230 meters, followed by a second tube with an inside diameter of 12 mm and a length of 18 meters.

By virtue of a pressure drop which was deliberately insufficient with regard to an elevated heating potential in tubular reactor C, it was found that the suspension passed through successive states of boiling at the outlet from reactor C and in holding flask D.

The suspension was finally collected in G where separation of the liquid and solid phases was effected.

Taking a sample from the solid phase, the same ignition loss and X-ray examination tests were carried out, and confirmed complete conversion of hydrargillite to boehmite.

As in Example 1, it was found that the grains of boehmite produced were finer than the sizes of the grains of the starting hydrargillite, as can be seen from the following table:

| % by weight of grains smaller than | 160μ | 146μ | 124μ | 100μ | 80μ | 60μ | 45μ | 30μ | 15μ |
|---|---|---|---|---|---|---|---|---|---|
| Starting Hydrargillite | 95.5 | 90.3 | 79.9 | 59.9 | 53.7 | 17.7 | 8.1 | 1.8 | 0 |
| Boehmite produced | 94.6 | 92.7 | 83.8 | 72.8 | 56.4 | 37.8 | 30.8 | 26.7 | 21.2 |

Finally, as in Example 1, it was found that the amount of sodium hydroxide expressed as $Na_2O$ had changed from 4450 ppm for the hydrargillite to 1100 ppm for the boehmite produced by the process of the invention.

EXAMPLES 3 to 8

In these Examples, different concentrations of dry material in the suspension to be subjected to the hydrothermal treatment was tried, in order to evaluate the influence of this parameter upon the degree of conversion, grain size and proportion of $Na_2O$.

For that purpose, the suspensions of hydrargillite in water were prepared as described in Example 1, but with particular amounts per hour of hydrargillite and water in each Example, as will be seen from the summary set out in the following table, the hydrargillite used having a moisture content of 9.6% by weight with respect to the moist product:

| Example No. | 3 | 4 | 5 | 6 | 7 | 8 |
|---|---|---|---|---|---|---|
| Hourly flow rate in l/h of water used | 990 | 835 | 800 | 760 | 740 | 710 |
| Hourly flow rate in kg/h of moist hydrargillite | 445 | 770 | 850 | 910 | 974 | 1035 |
| Amount of dry matter in the suspension in g/l expressed as $Al_2O_3$ | 219 | 380 | 418 | 452 | 480 | 510 |

All the apparatus described in Example 2, at A, B and C was the same, while holding balloon flask D was 100 liters in volume and was heated at its periphery by means of electrical resistances of controlled output.

The suspension issuing from D was cooled in F in the same manner as that described in Example 2.

After the cooling zone, the suspension circulated into pressure-drop zone H which was formed by a first tube which was 15 mm in inside diameter and 230 meters in length, followed by a second tube which was 12 mm in inside diameter and 96 meters in length, being much larger than in Example 2.

In all these Examples, the temperature at the outlet from heat exchanger C was from 233° C. to 235° C., while the temperature at the outlet from holding flask D was from 218° C. to 222° C., the pressure in the flask being at the minimum 34 bars, thus avoiding any danger of boiling in the whole of the apparatus.

Just as in the other Examples, the suspension issuing from H was collected at G where separation of the solid and liquid phases was effected.

Taking samples from the solid phase produced in each Example, it was confirmed that the conversion of hydrargillite to boehmite was complete, both by virtue of loss from ignition and by virtue of X-ray examination.

Finally, the grain size of the boehmite produced by hydro-thermal conversion was measured for each of Examples 3 to 8.

In order to measure the development of the grain size in the course of the conversion operation, the following table sets out the increase in per cent by weight in the proportion of grains of boehmite with respect to the initial grains of hydrargillite which pass through the meshes of a standard 45-micron sieve.

The same table also shows the amount of sodium hydroxide expressed as $Na_2O$, as measured on the boehmites produced in each of Examples 3 to 8, it being assumed that the initial amount of sodium hydroxide present in the hydrargillite before the hydro-thermal conversion operation was 4600 ppm:

| Examples | 3 | 4 | 5 | 6 | 7 | 8 |
|---|---|---|---|---|---|---|
| Amount of dry material in g/l | 219 | 380 | 418 | 452 | 480 | 510 |
| Increase in % by weight of the fraction passing through a 45-micron sieve | 18.4 | 8.8 | 6.4 | 2.8 | 1.5 | 0.4 |
| Amount of $Na_2O$ | 850 | 1050 | 1150 | 1200 | 1250 | 1500 |

Thus, it was highly interesting to find that the initial grain size observed in the hydrargillite was preserved in the boehmite state, with the highest proportions of dry material in the suspension.

Finally, it was also found that the amount of sodium hydroxide expressed as $Na_2O$ was very greatly reduced, as in the other examples.

We claim:

1. A continuous process for the production of boehmite of controlled grain size by dehydration of hydrargillite, wherein the grain size of the boehmite produced is less than or equal to the grain size of the hydrargillite and the concentration of alkaline impurities in the boehmite produced is less than the concentration of alkaline impurities in the hydrargillite, comprising mixing hydrargillite with water to form a suspension containing 150 to 700 g/l of dry material expressed as $Al_2O_3$, passing the suspension under pressure through a reaction zone, heating the suspension in a heating zone of the reaction zone to a reaction temperature within the range of 200°–270° C. at a speed of temperature rise of 1° C./minute, and thereafter maintaining the suspension in a holding zone of the reaction zone for a period of from 1 minute to 60 minutes at a temperature in the said range for reaction to convert hydrargillite to boehmite, reducing the pressure of the suspension issuing from the reaction zone to atmospheric pressure with cooling whereby the resulting suspension comprises a solid phase of boehmite within a liquid phase, and then separating the boehmite as a solid phase from the liquid phase.

2. A continuous process for the production of boehmite of controlled grain size as claimed in claim 1, in which the step of reducing the pressure of the suspension issuing from the reaction zone with cooling comprises the step of passing the suspension through a heat exchanger for reduction in temperature and through an expansion zone for reduction of pressure to atmospheric pressure.

3. A continuous process as claimed in claim 1 in which the suspension is maintained in the holding zone for a time in the range of 3 to 10 minutes.

4. A continuous process as claimed in claim 1, in which the hydrargellite is present in the suspension in an amount within the range of 400 to 600 grams per liter.

5. A continuous process as claimed in claim 1, in which the suspension is heated to a temperature within the range of 220°–240° C.

6. A continuous process for the production of boehmite of controlled grain size as claimed in claim 2, in which the suspension is passed through the heating zone at a rate of 1.5 meters per second.

7. A continuous process for the production of boehmite of controlled grain size as in claim 1 in which the suspension from the reaction zone is passed through a heat exchanger for temperature reduction immediately following expansion for reduction of pressure.

8. A continuous process for the production of boehmite of controlled grain size is in claim 1, in which the pressure reduction and temperature reduction is carried out simultaneously during the pressure reduction step.

9. A continuous process for the production of boehmite of controlled grain size as in claim 1, in which the pressure reduction is controlled to cause boiling of the suspension while in the reaction zone thereby to increase the proportion of fine grains adapted to pass through a standard 15 micron mesh sieve.

10. A continuous process for the production of boehmite of controlled grain size as in claim 1, in which lowering of the pressure to atmospheric pressure is carried out by passing the suspension from the reaction zone to a series of tubes of decreasing diameter and length.

* * * * *